(12) United States Patent
Murrell et al.

(10) Patent No.: US 6,358,154 B1
(45) Date of Patent: *Mar. 19, 2002

(54) FLEXIBLE COUPLING

(75) Inventors: Peter William Murrell; Alan Jeffrey Posnett; Anthony Whitehouse, all of Cumbria (GB)

(73) Assignee: Marconi Marine (VSEL) Limited, Cumbria (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,019

(22) Filed: Feb. 18, 1999

(30) Foreign Application Priority Data

Feb. 20, 1998 (GB) .............................. 9803627

(51) Int. Cl.[7] .................................. F16D 3/62
(52) U.S. Cl. ........................................ 464/81; 464/76
(58) Field of Search ............................. 464/81, 51, 73, 464/83, 82, 87, 89, 90, 147, 150, 152, 155, 76

(56) References Cited

U.S. PATENT DOCUMENTS

| | | | | |
|---|---|---|---|---|
| 2,122,838 A | * | 7/1938 | Guy ............................ | 464/89 |
| 2,146,765 A | * | 2/1939 | Ricefield .................... | 464/14 |
| 2,764,003 A | * | 9/1956 | Croset ......................... | 464/89 |
| 2,909,911 A | * | 10/1959 | Spaetgens ................... | 464/89 |
| 3,505,832 A | * | 4/1970 | Braithwaite ................ | 464/76 |
| 3,636,729 A | * | 1/1972 | Patel ........................... | 64/14 |
| 3,884,049 A | | 5/1975 | Pauli | |
| 4,344,515 A | | 8/1982 | Grote et al. | |
| 4,409,904 A | | 10/1983 | Eichinger et al. | |
| 4,664,037 A | | 5/1987 | Piepenbreier | |
| 4,743,218 A | | 5/1988 | Aubrey et al. | |
| 4,816,007 A | * | 3/1989 | Box ............................. | 464/74 |
| 4,943,261 A | | 7/1990 | Smith | |

FOREIGN PATENT DOCUMENTS

| | | |
|---|---|---|
| EP | 218377 | 4/1987 |
| EP | 218378 | 4/1987 |
| EP | 0397524 | 5/1990 |
| GB | 557424 | 11/1943 |
| GB | 1155083 | 6/1969 |
| GB | 1211689 | 11/1970 |
| GB | 2116671 | 9/1983 |
| GB | 2226383 A | 6/1990 |
| GB | 2226383 | 6/1990 |

* cited by examiner

Primary Examiner—Lynne H. Browne
Assistant Examiner—Kenneth Thompson
(74) Attorney, Agent, or Firm—Donald C. Casey, Esq.

(57) ABSTRACT

A flexible coupling (12, 16) for transmitting torque from a drive shaft (10) to a driven shaft (18) is described. The coupling (12, 16) comprises a rotatable drive member (20) securable to the drive shaft (10); a rotatable driven member (22) securable to the driven shaft (18); a plurality of radial vanes (24) are provided on the drive member (20) which interdigitate with a plurality of radial vanes (26) on the driven member (22) and resiliently deformable elements (30, 32) are interposed between the interdigitating vanes (24, 26) to transmit torque there between. The resiliently deformable elements (30, 32) are detachably secured to only either the vanes (24) on the drive member or the vanes (26) on the driven member and are removeable in a radial direction without having to remove the drive or driven vanes from the coupling.

15 Claims, 10 Drawing Sheets

FLEXIBLE COUPLING

FIELD OF THE INVENTION

This invention relates to a flexible coupling for transmitting torque from a drive shaft to a driven shaft and which attenuates the transmission of noise and/or vibration by or through a drive member and a driven member.

BACKGROUND OF THE INVENTION

Flexible couplings are used where there is likely to be misalignment between coaxially aligned members of a power train, for example, between the engine and the propeller shaft of a ship. One form of known flexible coupling comprises a drive member and driven member which include inter-engaging means in the form of inter-digitating radial vanes which are circumferentially spaced to which flexible load transmitting elements are attached and interposed between corresponding vanes. The flexible load transmitting elements, which typically comprise pads made from a number of layers of resilient deformable material interposed by rigid spacer plates, transmit torque from the vanes of the drive member to the driven member. The pads, being resiliently deformable, minimise any noise and/or vibration transmission by or through the coupling. Whilst the known coupling arrangements are found to work effectively the inventors have appreciated that they have certain limitations.

For example, in the case of ships it is often the case that the power required in the reverse (astern) direction of rotation is less than that required when operating in the forward (ahead) direction of rotation. For such applications a flexible coupling which was designed for equal power transmission in both directions of rotation would be over-engineered when the coupling operates in the astern sense and results in a coupling which is heavier than it need be. To overcome this problem it has been proposed to design couplings on an asymmetric basis, that is the coupling has different properties depending on the direction of rotation. For example, in one arrangement a larger number of pads is provided for operation in the principal direction (ahead) of rotation and fewer in the reverse direction (astern). To ensure that the coupling is as small as possible the resultant gaps between the interdigitating vanes where pads have been removed are reduced by altering the circumferential spacing of the vanes.

In an asymmetric coupling arrangement the way in which the pads are attached to the vanes depends on the direction of rotation. For example various techniques are known such as bonding or fitting the pads and spacer plates into slotted openings on the vanes. Typically the slots are dovetailed and the sets of pads slid into place on the vanes. The dovetail joint arrangement is expensive and time consuming to machine to close tolerances and requires considerable hand labour to obtain a proper fit. The inventors have appreciated that a particular disadvantage of this arrangement is that different vanes are required on the drive and driven members and these are particularly costly to manufacture. To improve the uniformity of compressional loading over the pad surface the pads are wedge shaped (radially tapered) with a taper angle of between 8° and 11°, and are of greatest thickness at the circumference and least towards the axis of rotation. Such an arrangement ensures that the force per unit thickness of pad is substantially constant over the pad's surface area. A disadvantage of this arrangement is that when a new coupling is required which can transmit a different amount of torque, a new set of pads has to be designed. In particular, the angle of taper of the pads is altered in dependence on the diameter of the drive or driven members to maintain a constant circular pitch which ensures a constant pad pressure. Since the pads have to undergo rigorous testing which can take many weeks (typically the pads are tested for 10 million cycles at a rate of rotation of a few hundred revolutions per minute), this significantly increases the cost of designing new couplings.

The present invention arose in an endeavour to provide a flexible coupling which at least in part overcomes the limitations of the known arrangements.

SUMMARY OF THE INVENTION

According to the present invention there is provided a flexible coupling for transmitting torque from a drive shaft to a driven shaft, the coupling comprising: a rotatable drive member securable to the drive shaft; a rotatable driven member securable to the driven shaft; a plurality of radial vanes on the drive member which interdigitate with a plurality of radial vanes on the driven member and resiliently deformable elements interposed between the interdigitating vanes to transmit torque there between; wherein the resiliently deformable elements are detachably secured to only either the vanes on the drive member or the vanes on the driven member and are removeable in a radial direction without having to remove the drive or driven vanes from the coupling.

Advantageously in its rest state none of the resiliently deformable elements are in a state of compression thereby enabling individual elements to be readily replaced whilst the coupling remains in situ. In contrast in the known couplings the resilienty deformable elements are secured to both the drive and driven vanes and are in a state of pre-compression to eliminate the element being in a state of tension when the coupling operates in a reverse direction of rotation. Since the elements are pre-compressed this makes it difficult, if not impossible, to replace or service the elements without having to remove one or more vanes and in many cases without having to dismantle the entire coupling which requires de-installation of the coupling.

In a much preferred arrangement the resiliently deformable elements for one direction of rotation, most preferably the principal direction of rotation of the coupling, are restrained from moving in a radial and axial direction but are free to move in a circumferential direction in relation to the corresponding vane to which it is not secured.

In a particularly preferred embodiment of the invention each vane has a substantially flat surface and an opposite surface having a channel formed therein, the vanes being arranged on the drive and driven members such that the channel in a vane on the drive member is used to detachably secure one face of the resiliently deformable element and the opposite face of the resiliently deformable element engages in the channel on the adjacent vane on the driven member to restrain its movement in the axial and radial directions.

Advantageously the radial vanes are detachably secured to the drive and driven members and are removeable in a radial direction without having to dismantle the coupling thereby further facilitating servicing and maintenance of the coupling.

Preferably the vanes on the drive and driven members are interchangeable and therefore the same vane can be used on both members of the coupling which significantly reduces the cost of the coupling.

Most conveniently the vanes are radially tapered and the resiliently deformable elements have substantially parallel faces. A particular advantage of using elements which have substantially parallel faces is that new couplings can be readily designed which utilise the same elements and thereby eliminate the need for expensive testing. Furthermore, having parallel faces enables the elements to be easily removed and replaced.

Advantageously the surface of the resiliently deformable elements in a circumferential plane of the respective rotatable member has a rounded perimeter. Due to the rounded shape of the resiliently deformable elements they are better able to more uniformly withstand any shear component of force in the plane of the elements as a result of coaxial misalignment of the drive and driven members. In contrast the known couplings use square or rectangular deformable elements and are consequently better able to withstand shear forces which act in a direction between the corners of the element than those which act between the edges.

Preferably the shape of the resiliently deformable elements has a continuously curved shape and is advantageously substantially circular or substantially elliptical in shape. It will be appreciated that elements which are substantially circular have uniform characteristics for all directions of shear.

Alternatively the shape of the resiliently deformable elements is polygonal and the junction between adjacent sides is curved, such as a square with rounded corners.

Preferably the resilienity deformable elements are cylindrical. Although there will be a slight overloading of the element on the outermost edge such an arrangement enables the same elements to be used even when the size of coupling changes which eliminates the need for expensive testing of the elements.

The resiliently deformable elements advantageously comprise a first set of elements which are compressed in a first direction of rotation and a second set of elements which are compressed in a second direction of rotation and wherein the vanes are equally spaced circumferentially on the drive and the driven members and there are unequal numbers of first and second resiliently deformable elements. This is particularly advantageous since a replacement set of elements can be fitted prior to removing the worn ones. Furthermore, the coupling can be readily adapted by adding or removing elements. This feature is considered inventive in its own right.

The resiliently deformable elements preferably comprise a plurality of resiliently deformable pads having rigid spacer plates interposed there between.

According to a second aspect of the invention a flexible coupling for transmitting torque from a drive shaft to a driven shaft, the coupling comprising: a rotatable drive member securable to the drive shaft; a rotatable driven member securable to the driven shaft; a plurality of radial vanes on the drive member which interdigitate with a plurality of radial vanes on the driven member and first and second resiliently deformable elements interposed between the interdigitating vanes to transmit torque there between wherein the first deformable elements are compressed in a first direction of rotation and the second deformable elements are compressed in a second direction of rotation; wherein the vanes are equally spaced circumferentially on the drive and the driven members and there are unequal numbers of first and second resiliently deformable elements.

BRIEF DESCRIPTION OF THE DRAWINGS

For a better understanding of the invention a flexible coupling in accordance with the invention will now be described by way of example only with reference to the accompanying drawings in which:

FIG. 3 is a portion of the flexible coupling of FIG. 2 as viewed in a radial direction showing the drive and driven members with inter-engaging vanes with sets of ahead and astern pads interposed in between;

DETAILED DESCRIPTION OF ONE EMBODIMENT OF THE INVENTION

Figure 1:
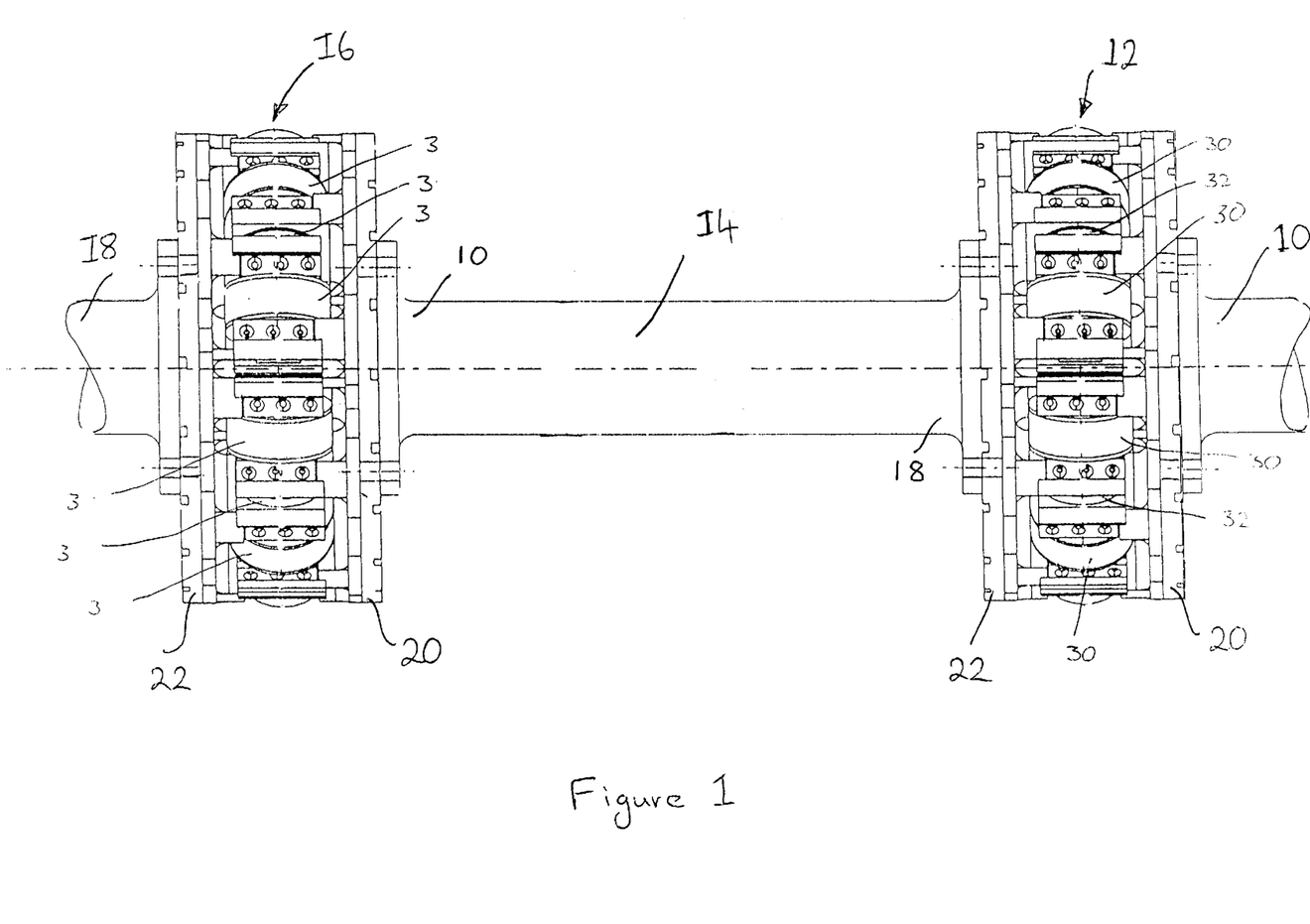
FIG. 1 is a part of a drive train incorporating two flexible couplings in accordance with the invention.

Referring to FIG. 1, there is shown apart of a power train which comprises adrive shaft 10 which is connected by a first flexible coupling 12 to an intermediate shaft 14 (often termed a Cardan shaft) which, in turn, is connected to a second flexible coupling 16 and finally to a driven shaft 18 which could, for example, be the propeller shaft of a ship. The present invention concerns the construction of the flexible couplings 12 or 16 which are both identical. Accordingly the construction of only the first coupling 12 will be described, though it will be appreciated that this applies equally to the second.

Figure 2:
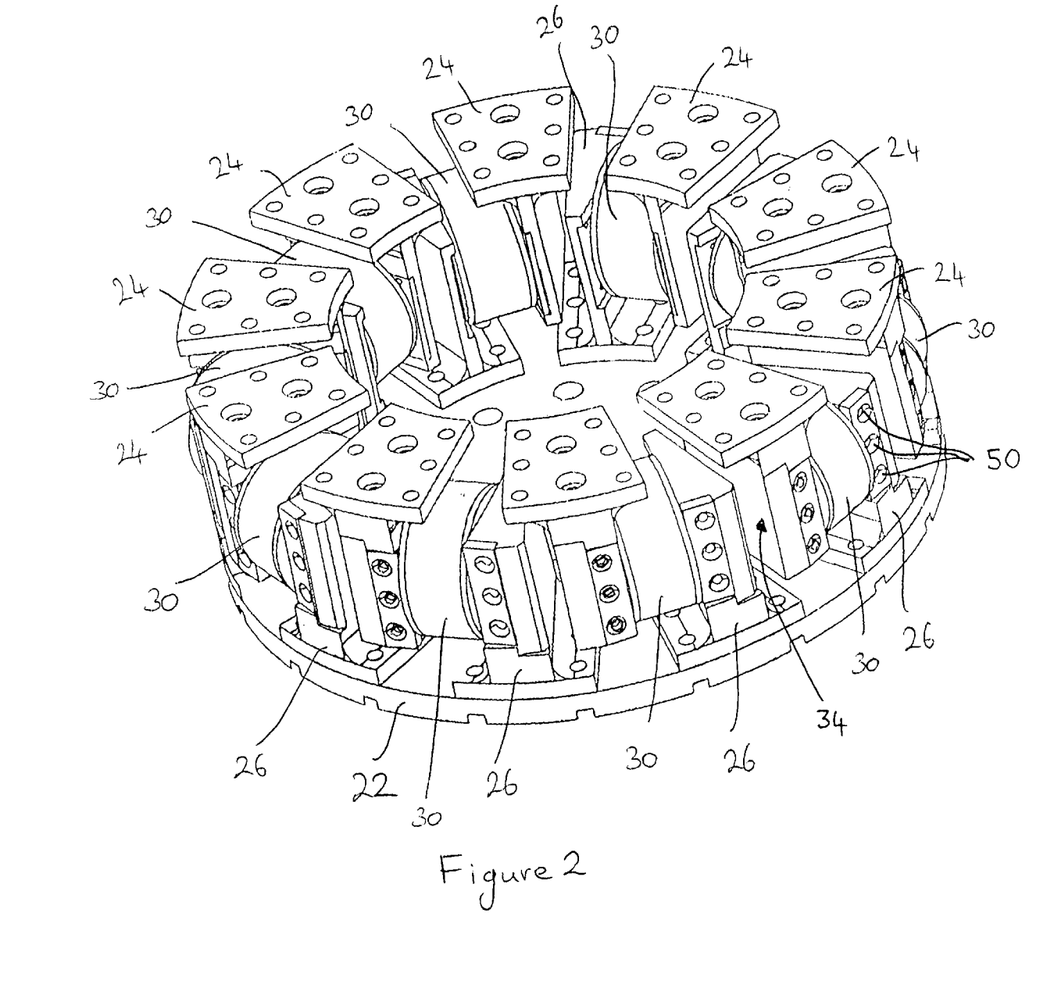
FIG. 2 is an isometric view of a flexible coupling in accordance with the invention with the drive member and the astern pads removed for clarity.

The flexible coupling comprises a rotatable drive member 20, in the form of a circular plate, which is connected to the drive shaft 10, and a rotatable driven member 22, also in the form of a circular plate, which is connected to the driven shaft 18. The drive member 20 and driven member 22 are coaxially aligned in a conventional manner and each includes ten forged steel vanes 24 and 26, respectively, which interdigitate with each other as is best illustrated in FIG. 2. For clarity the drive member 20 and driven shaft 18 are removed in the Figure. Each of the vanes 24 and 26 is identical and is formed as a T-section with lateral flanges 24a, 24b, 26a and 26b respectively to enable its attachment to the drive member 20 and driven member 22. Each vane 24 is securely fastened to the drive member 20 using two locating dowels and six bolts 28, as will be apparent from FIGS. 5 and 8. Each of the vanes 26 is securely fastened to the driven member 22 in a like manner. Whilst the attachment of the vanes in this way is preferred, it will be appreciated that the vanes can be attached by other methods, such as welding or brazing, or integrally formed as part of the drive member 20 or driven member 22.

Figure 4:
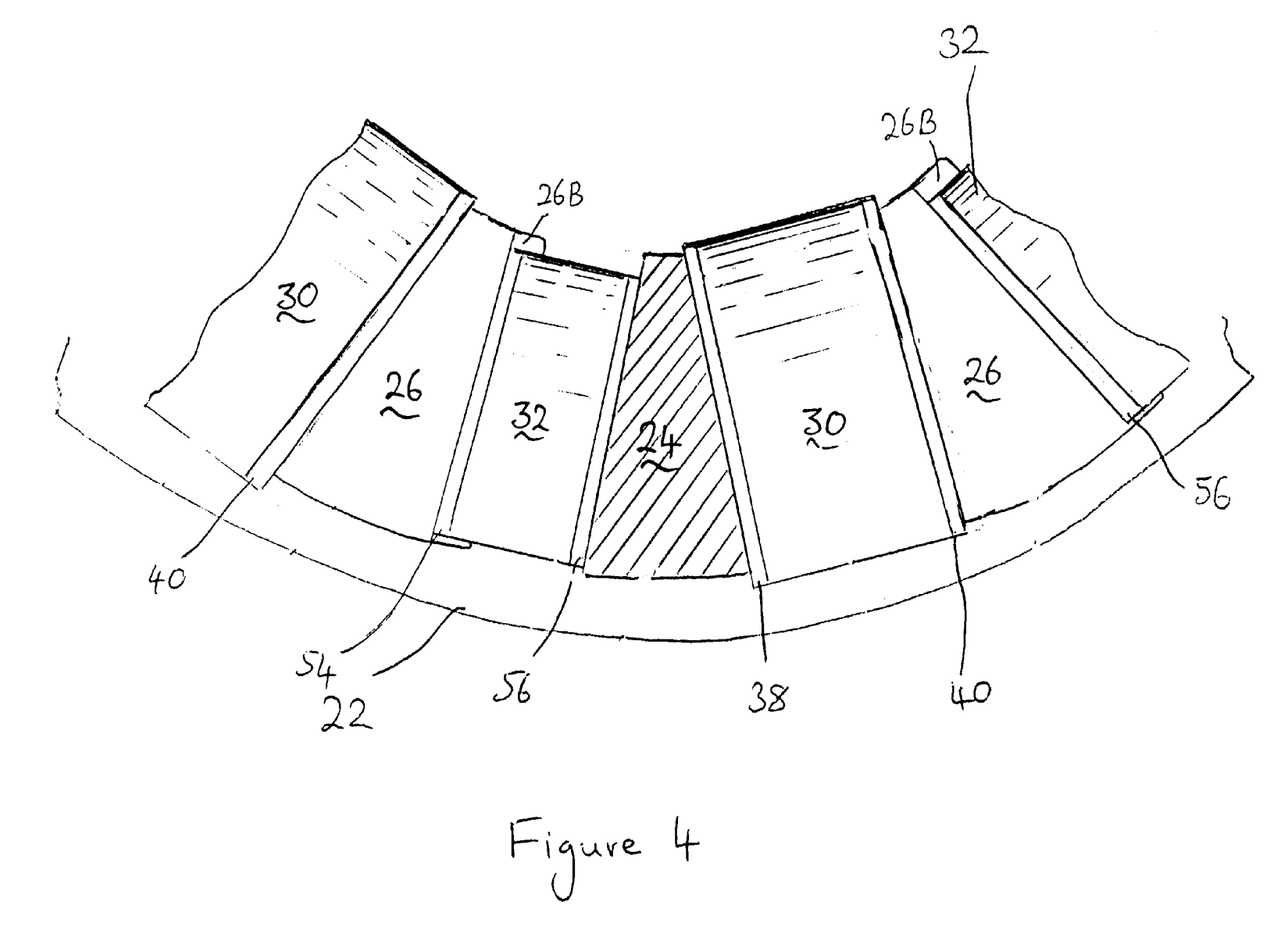
FIG. 4 is a cross-section through the coupling of FIG. 3 in the direction 3—3 of FIG. 3.

Referring to FIG. 4, it will be seen that each of the vanes 24 and 26 is radially tapered such that adjacent faces of inter-engaging vanes define a volume having parallel faces.

Securely fastened to a first side of the vanes 24 are forward-driving, resiliently deformable, load-transmitting elements 30. Securely fastened to the opposite side of the vane 24 are rearward-driving, resiliently deformable, load-transmitting elements 32. Each of the load-transmitting elements 30, 32 is made from moulded rubber with a number of integral rigid steel interleaves. The forward-driving elements 30 (hereinafter referred to as "ahead pads", since they are operable under a compressive load in a forward, or ahead, direction of rotation) have ten rubber leaves and nine steel interleaves. The rearward-driving, load-transmitting elements 32 (hereinafter referred to as "astern pads", as they are operable under a compressive load in a rearward, or astern, direction of rotation) have two rubber leaves and one steel interleaf. The curved rubber surface of the pads 30, 32 is coated with neoprene to protect the rubber from oil spray during operation of the coupling.

In use, the ahead pads 30 bear on a first side of a corresponding vane 26 on the driven member so that torque is transmitted between the drive member 20 and the driven member 26 in an ahead (forward) direction of rotation. Alternatively, torque is transmitted between the drive member 20 and driven member 22 in an astern (reverse) direction of rotation by the astern pads 32 bearing on the opposite side of the vane 26 on the driven member 22.

Both the ahead pads 30 and astern pads 32 are substantially right circular cylinders in shape and are orientated so that torsional loads result in elastomeric compression of the pad. Any misalignment between the drive member 20 and driven member 22, both axial and radial, results in elastomeric shear of the pad. Since the pads have circular faces, as viewed in the axial plane, the pads can uniformly cope with elastomeric pad shear. In contrast, the known coupling arrangements which use square or rectangular pads are better able to withstand shear when it runs in a direction between the corners of the pad rather than between the sides. It will be appreciated by those skilled in the art that other shapes of pad can also be used, such as elliptical or other rounded shapes.

Figure 5:
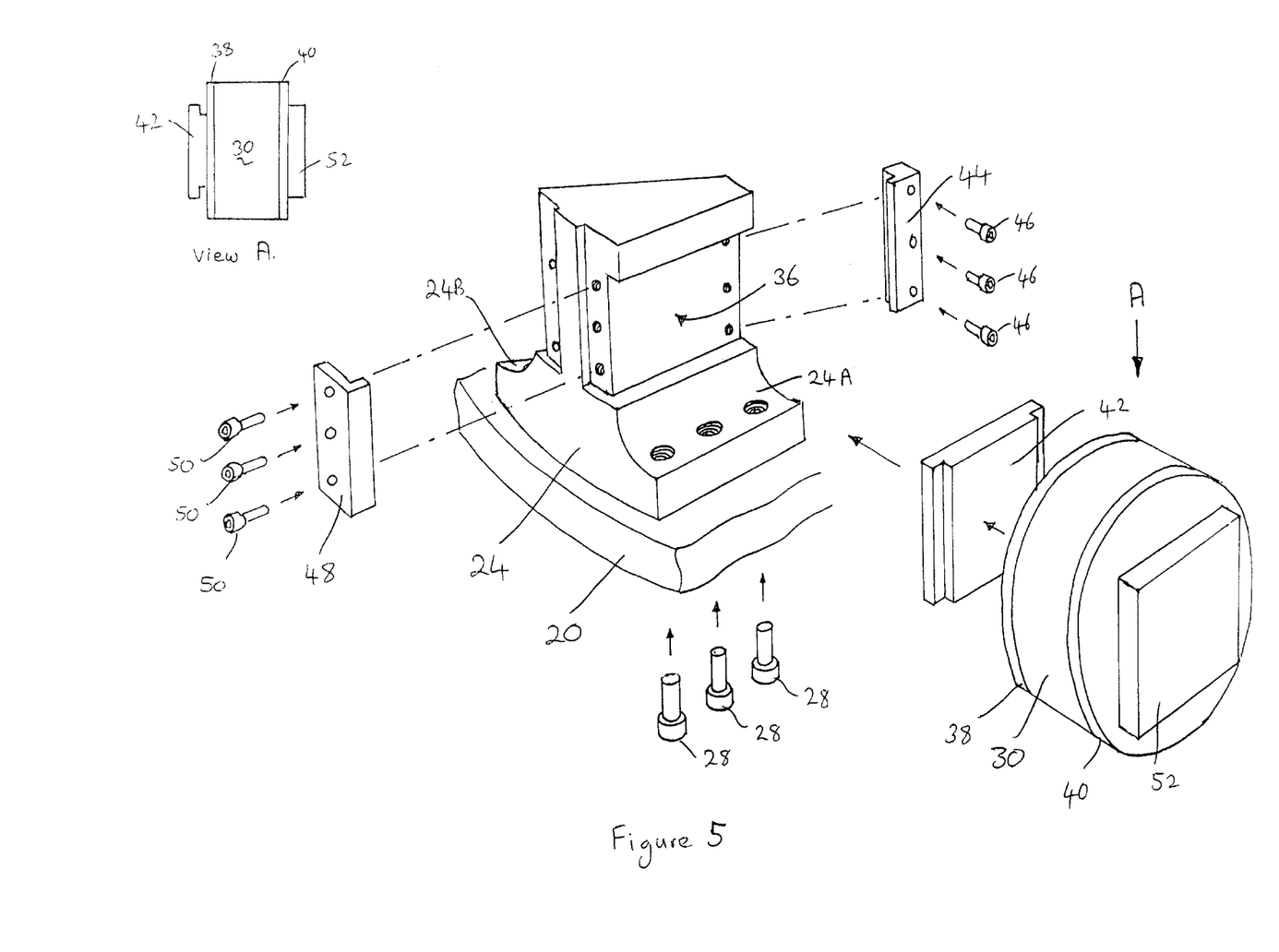
FIG. 5 is an exploded isometric view of one of the vanes on the drive member showing the method of attachment of the ahead pad.
Figure 6:
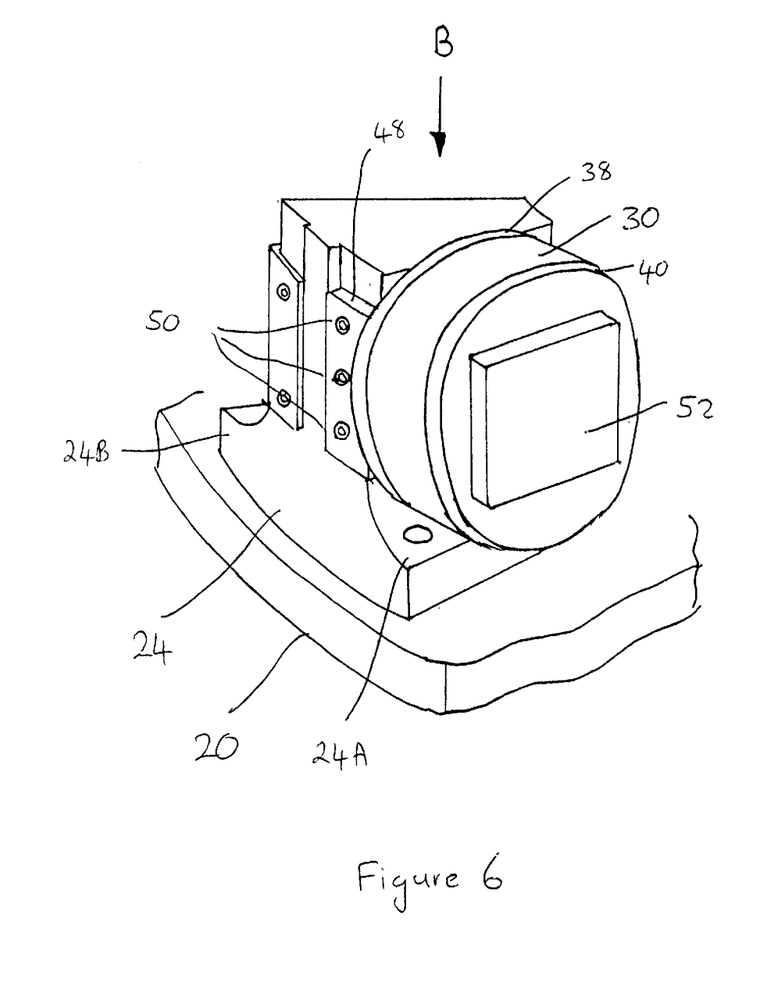
FIG. 6 is an isometric view of the vane of FIG. 5 with the ahead pad secured to it.
Figure 7:
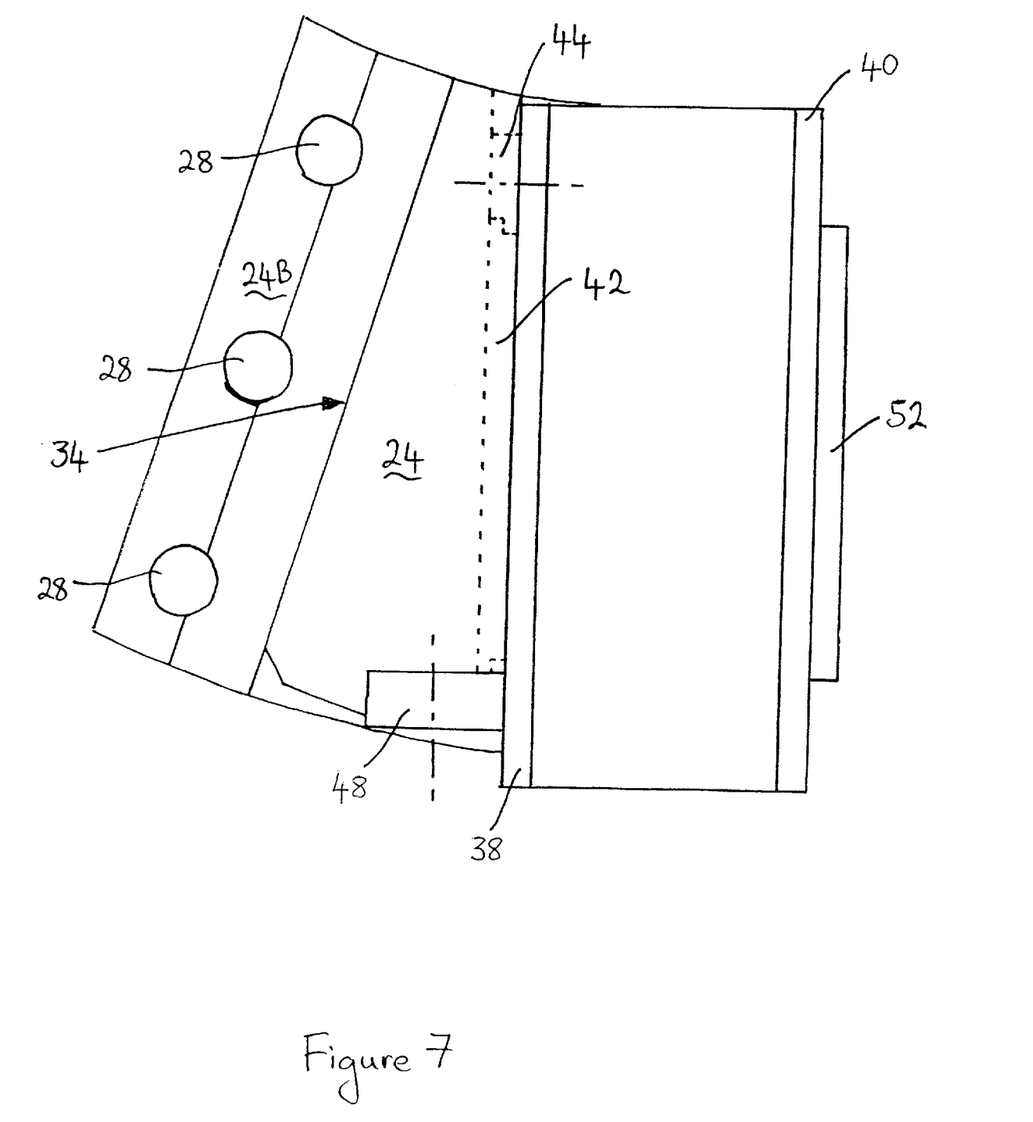
FIG. 7 is a plan view of the vane of FIG. 6 in the direction B.

Referring to FIGS. 5, 6 and 7, there is shown the method by which the ahead pads 30 are secured to the vanes 24. It will be appreciated that each vane has a first face 34 which is substantially flat (see FIG. 8) and an opposite face 36 which has a radially extending channel formed therein (see FIG. 5). As described above, the vanes 24 and 26 are identical.

Referring to FIG. 5, each of the ahead pads 30 has circular metal end plates 38, 40 attached to its outer surfaces when the pad is moulded. The end plate 38 has machined on its outer surface a T-slotted plate 42 as will be apparent from View A of FIG. 5. To aid understanding the slotted plate 42 is illustrated as a separate component to the end plate 38 in the exploded view of FIG. 5. In practice, however, the T-slotted portion is machined as an integral part of the end plate 38. The T-slotted end plate 42 is configured to fit snugly into the channel 36. To secure the ahead pad to the vane 24, a keep block 44 is firstly inserted into the channel 36 and secured by means of three bolts 46. The keep block 44 has a rebated edge which corresponds and co-operates with the T-slotted end plate 42. The T-slotted plate 42 with the pad attached is slid into the channel 36 such that it engages with the key formed by the keep block 44. A keep plate 48 is then secured to the end of the vane 40 and includes a radially extending shoulder which engages with and co-operates with the opposite slot on the T-slotted plate 42 to securely hold the plate 42 into tight engagement in the channel 36. The keep plate 48 is then secured to the vane by means of three bolts 50. The ahead pad 30 is thus rigidly and detachably secured to the face 34 of the vane 24.

Figure 3:
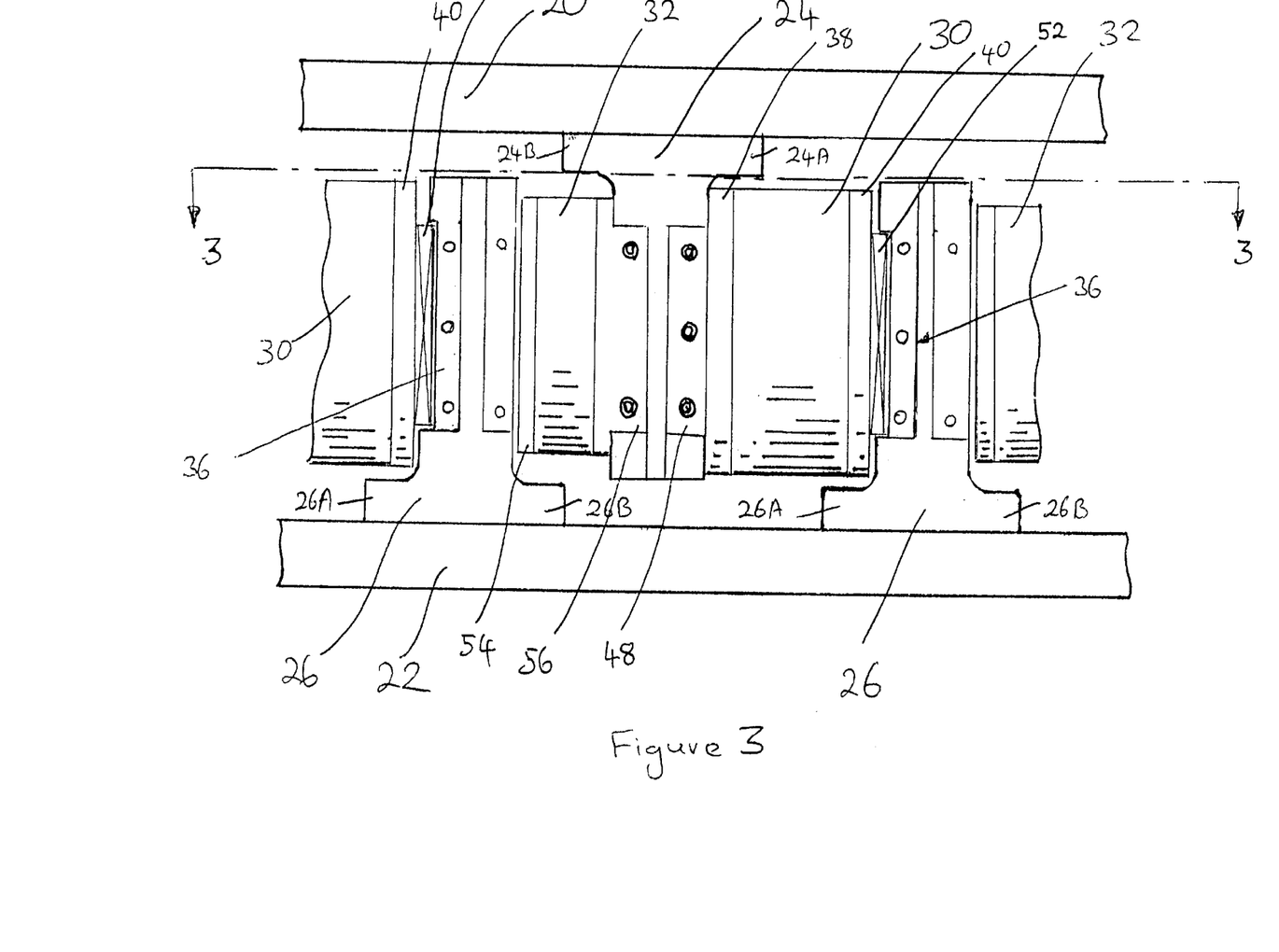

The end plate 40 on the opposite face of the pad 30 has a plain square spigot 52 extending from its surface. As with the T-slotted plate 42 the spigot 52 is machined as an integral part of the end plate 40. The spigot 52 is dimensioned such that it can readily engage in the channel 36 of the adjacent vane as is best illustrated in FIG. 3. When the coupling is running in an ahead direction of rotation, the spigot 52 engages in the channel 36 of the adjacent vane 26. To prevent the spigot moving in a radial direction, a keep block and keep plate similar to those described above are bolted to the vane 26. It will be appreciated that the spigot 52 is not secured to the vane 26 and is free to slide in and out of the slot 36 in a circumferential direction. It is however restrained from moving in a radial and axial direction, which allows the transmission of only compressive loads through the ahead pads 30. Tensile loads are thus prevented in the ahead pads 30. A layer of "Tufnol" (a wear resistant fibre reinforced phenolic resin) is secured to the surfaces of the plate 42 and the spigot 52 to prevent metal-to metal contact with the corresponding surfaces of the vanes ("Tufnol" is a registered Trademark of Tufnol Ltd). It will be appreciated that since the ahead pad assembly 30 has parallel faces, the pads 30 can be readily inserted and/or replaced by removal of the keep plates 48. Furthermore, since the ahead pads 30 are secured only to the vane 24 and not to the vane 26, when the coupling operates in a reverse (astem) direction of rotation the pads 30 will not be under tension. As a result the pads 30 do not need to be in a state of pre-compression when the coupling is in its rest state thereby enabling individual pads 30 to be replaced without requiring the removal of the vanes. It is thus possible to replace the pads whilst the coupling remains in situ.

Figure 8:
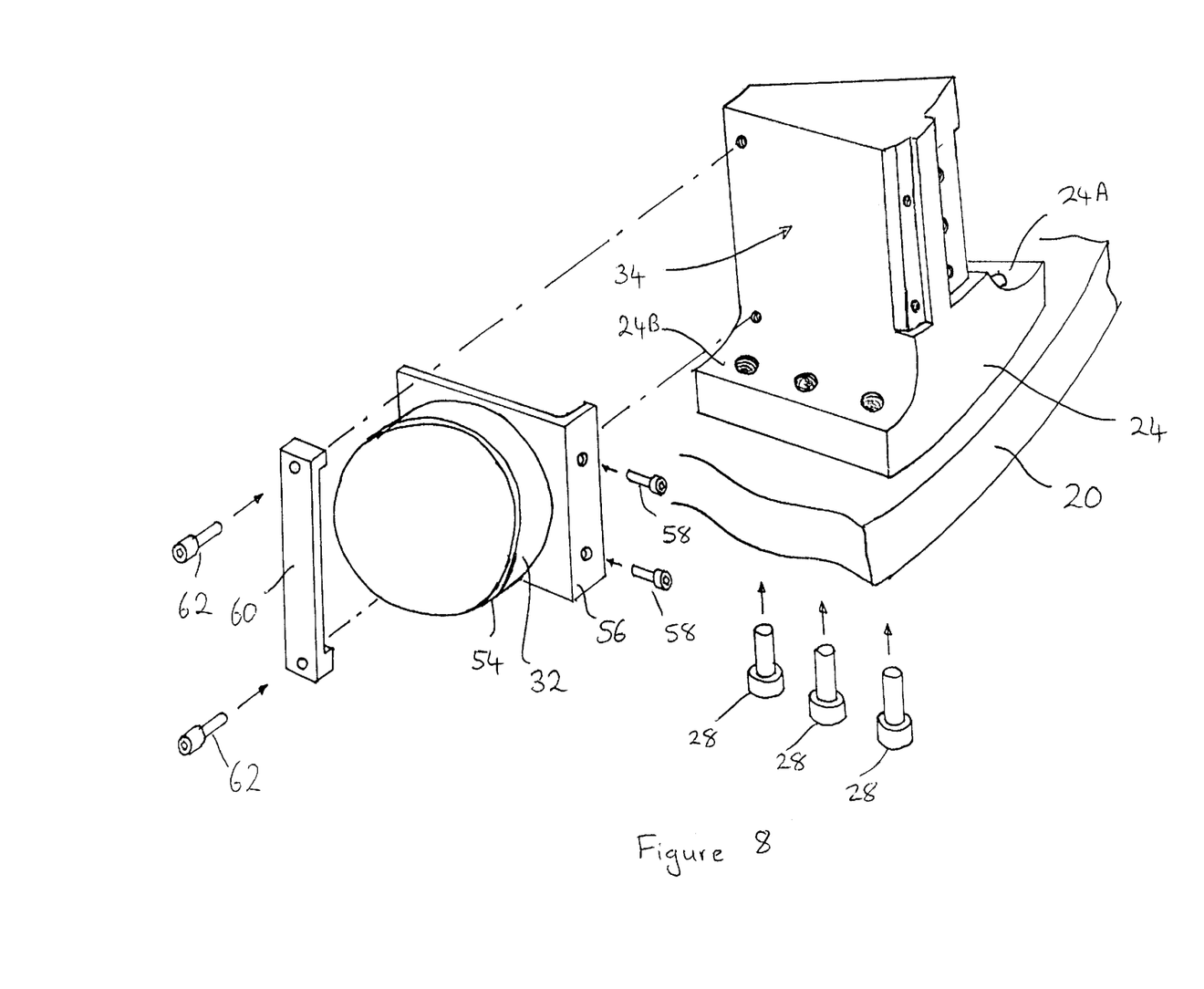
FIG. 8 is an exploded isometric view of one of the vanes on the drive member showing the method of attachment of the astern pad.
Figure 9:
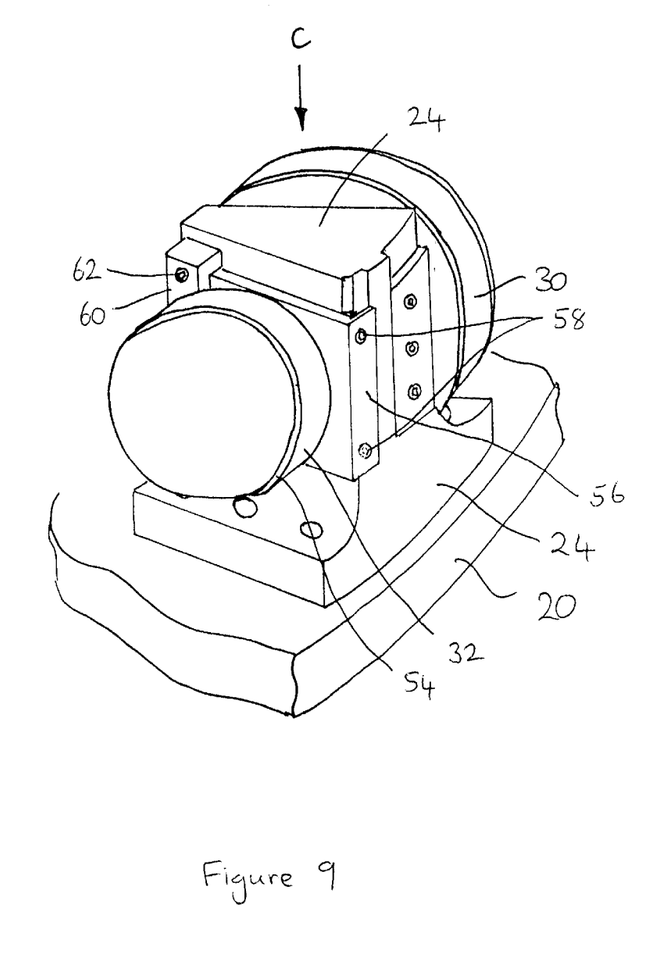
FIG. 9 is an isometric view of the vane of FIG. 8 with the astern pad secured to it.
Figure 10:
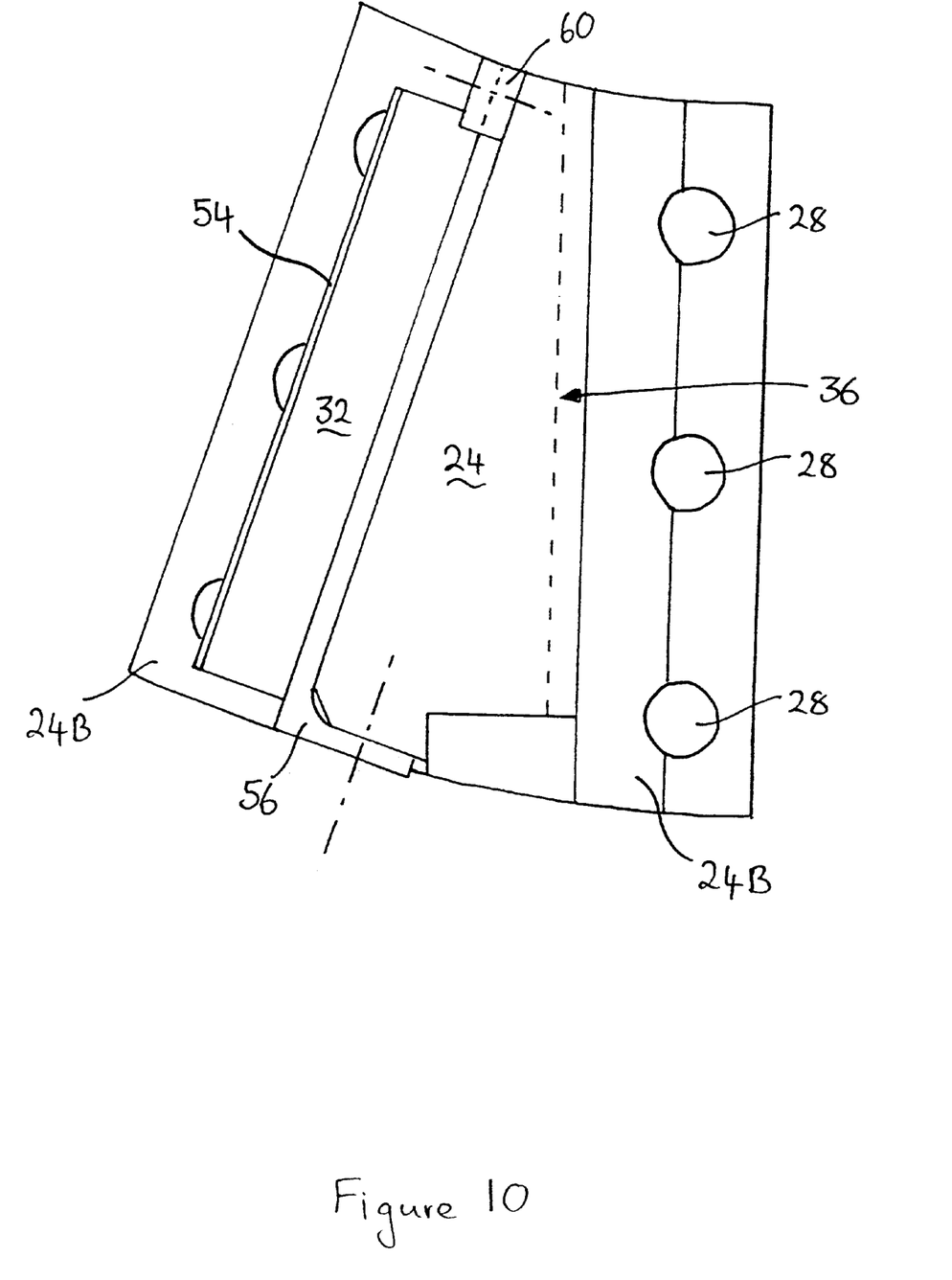
FIG. 10 is a plan view of the vane of FIG. 9 in the direction C.

Referring to FIGS. 8, 9 and 10, the method by which the astern pad 32 is attached to the vane 24 is illustrated. The astern pad 32 is secured to the flat face 34. The pad 32 has a plain circular end plate 54 on one surface and a square end plate 56 on the opposite surface. The circular end plate 54 has a Tufnol coating on its surface and, during reverse rotation of the coupling, this surface engages with the corresponding flat surface 34 of the adjacent vane 26 on the driven member 22. The circular end plate 54 is not secured to the surface of the vane 26. The square end plate 56 is shaped to incorporate a keep plate which enables the pad 32 to be affixed to the vane 24 by means of two bolts 58. To ensure the end plate is securely fastened to the flat surface 34 a keep block 60 is fastened over the end plate 56 using two bolts 62. The plain end plate 54 provides a plain contact surface with the mating surface 34 of the adjacent vane 26, which therefore allows some pad slippage (movement in a radial and axial direction) during operation, although the astern pad primarily transmits compressive loads. To prevent any wear as a result of astern pad slippage, a sheet of fiberglass is bonded to the face 34 of the corresponding vane 26. Although astern pad slippage will reduce the amount of torque the coupling can transmit in the astern direction, this is not a problem since operation in this direction is far more infrequent and is usually at much lower torques. As with the ahead pads 30, the astern pads 32 are secured only to the vane 24 and so are not under tension when the coupling operates in a forward (ahead) direction of rotation. As a result no pre-compression of the pads 32 is necessary when the coupling is in its rest state which enables individual pads to be replaced without requiring removal of the vanes.

It will be appreciated that since the vanes 24 on the drive member and the vanes 26 on the driven member are identical, this substantially reduces the cost of manufacturing the coupling. It will be further appreciated that by providing a channel on one face of the vane and having a flat surface on the other, a simple and effective way of securing the ahead and astern pads is provided. As it is often required to transmit much lower torques in one direction of rotation (usually the astern), often an order of magnitude lower, it is preferable to have only five astern pads as compared to ten ahead pads. Since the vanes 24 and 26 on the drive and driven members 20 and 22, respectively, are circumferentially equally spaced, gaps result. This arrangement is found to be particularly advantageous since a new set of astern pads can be fitted prior to the removal of the worn ones. Furthermore, the operating characteristics of the coupling can be readily altered by simply changing the number of pads.

It will be appreciated by those skilled in the art that variations may be made to the embodiment described which are within the scope of the invention. For example the T-slotted plate 42, keep block 44 and keep plate 48 are shown as having right angled shoulders which cooperate with each other to secure the ahead pad 30 to the vane 24. In a preferred arrangement these cooperating shoulders are dovetailed which eliminates the need for such close tolerances in the machinery or fitting of these components. Accordingly, the invention should not be limited to the specific embodiment illustrated in the accompanying drawings.

What we claim is:

1. A flexible coupling for transmitting torque from a drive shaft to a driven shaft, the coupling comprising: a rotatable drive member securable to the drive shaft; a rotatable driven member securable to the driven shaft; a plurality of radial vanes on the drive member and a plurality of radial vanes on the driven member which interdigitate with said vanes on the drive member; a first and a second set of resiliently deformable pads interposed respectively between the interdigitating vanes to transmit torque there between; said resiliently deformable first set of pads being detachably secured to the vanes on the drive member and said second set of pads being detachably secured to the vanes on the driven member and removeable in a radial direction without having to remove the drive or driven vanes from the coupling; said first set of pads being adapted to transmit compressive loads in one direction of rotation and said second set of pads being adapted to transmit compressive loads in an opposite direction of rotation of the drive shaft; each pad having opposed ends, said first set being secured to the drive member vanes at one end and free to move in one circumferential direction at the other end, said second set being secured to said driven member vanes at one end and free to move in an opposite circumferential direction at the other end and wherein the first set of pads has a different overall resilience than the second set of pads.

2. The coupling of claim 1 wherein the end of each pad free to move in a circumferential direction is also restrained in a radial or axial direction.

3. The flexible coupling of claim 1 wherein the pads in the first set are thicker than the pads in the second set.

4. The flexible coupling of claim 1 where there are an unequal number of pads in said first and second sets.

5. The flexible coupling of claim 1 wherein none of the pads are in a state of compression when the coupling is at rest.

6. The flexible coupling of claim 1 wherein each vane has a substantially flat surface and an opposite surface having a channel formed therein, the vanes being arranged on the drive and driven members such that the channel in a vane on the drive member is used to detachably secure one end of the resiliently deformable pad and the opposite face of the resiliently deformable pad engages in the channel on the adjacent vane on the driven member to restrain its movement in the axial and radial directions.

7. The flexible coupling of claim 1 wherein the vanes are interchangeable.

8. The flexible coupling of claim 5 wherein the vanes are radially tapered and the resiliently deformable pads have substantially parallel faces.

9. The flexible coupling of claim 1 wherein the surface of the resiliently deformable pads in a circumferential plane of the respectfully rotatable member has a rounded perimeter.

10. The flexible coupling of claim 9 in which the shape of the resiliently deformable pads is continuously curved.

11. The flexible coupling of claim 10 wherein the resiliently deformable pads are substantially circular in shape.

12. The flexible coupling of claim 9 in which the resiliently deformable pads are substantially elliptical in shape.

13. The flexible coupling of claim 9 wherein the shape of the resiliently deformable pads is polygonal and the junction between adjacent sides is curved.

14. The flexible coupling of claim 9 which the resiliently definable pads are cylindrical.

15. The flexible coupling of claim 1 in which the resiliently deformable pads have rigid spacer plates interposed therebetween.

* * * * *